United States Patent
MacCormack et al.

(10) Patent No.: US 7,120,174 B2
(45) Date of Patent: Oct. 10, 2006

(54) PULSED LASER APPARATUS AND METHOD

(75) Inventors: Stuart MacCormack, Mountain View, CA (US); Robert G. Waarts, Los Altos, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 347 days.

(21) Appl. No.: 10/867,531

(22) Filed: Jun. 14, 2004

(65) Prior Publication Data

US 2005/0276286 A1 Dec. 15, 2005

(51) Int. Cl.
*H01S 3/117* (2006.01)

(52) U.S. Cl. .......................................... 372/13; 372/10

(58) Field of Classification Search ................. 372/25, 372/69, 82, 18, 10, 11, 13; 359/333
See application file for complete search history.

(56) References Cited

U.S. PATENT DOCUMENTS

| | | | |
|---|---|---|---|
| RE29,421 E | 9/1977 | Scott | 331/94.5 |
| 4,955,025 A | 9/1990 | Mears et al. | 372/6 |
| 5,008,887 A | 4/1991 | Kafka et al. | 372/6 |
| 5,193,096 A * | 3/1993 | Amano | 372/13 |
| 5,444,723 A | 8/1995 | Chandonnet et al. | 372/14 |
| 5,448,579 A | 9/1995 | Chang et al. | 372/6 |
| 5,521,930 A | 5/1996 | Suni et al. | 372/13 |
| 5,790,574 A * | 8/1998 | Rieger et al. | 372/25 |
| 5,818,630 A | 10/1998 | Fermann et al. | 359/341 |
| 6,418,154 B1 | 7/2002 | Kneip et al. | 372/25 |
| 6,510,167 B1 | 1/2003 | Jain et al. | 372/6 |
| 6,831,936 B1 * | 12/2004 | Smart | 372/26 |

* cited by examiner

Primary Examiner—Minsun Oh Harvey
Assistant Examiner—Tuan N. Nguyen
(74) Attorney, Agent, or Firm—Allen, Dyer, Doppelt, Milbrath & Gilchrist, P.A.

(57) ABSTRACT

A laser apparatus for generating optical pulses is disclosed, said laser apparatus has a reflecting gain element preferably including a fiber gain medium. The reflecting gain element is coupled to a controllable reflecting/transmitting module having a reflecting state and a transmitting state, wherein the controllable reflecting/transmitting means are operable to switch from the transmitting state to the reflecting state to initiate a build-up of an optical pulse, and to switch back to the transmitting state for outputting the optical pulse before it reaches the reflecting/transmitting means after a cavity roundtrip. In a preferred embodiment, the controllable reflecting/transmitting module includes an acousto-optic switch at an output end of a laser operable to output the optical pulse in zeroth diffraction order.

24 Claims, 4 Drawing Sheets

PULSED LASER APPARATUS AND METHOD

FIELD OF THE INVENTION

The present invention relates to sources of pulsed laser radiation. This invention is particularly suitable for Q-switched fiber lasers employing intra-cavity modulators.

BACKGROUND OF THE INVENTION

Continuous-wave (CW) fiber lasers offer many advantages over other conventional diode pumped solid state (DPSS) lasers. Pulsed operation of such fiber lasers has many applications, but offers also some new challenges.

Generally, pulsed operation of a laser can be achieved by active or passive Q-switching or active or passive mode-locking. In Q-switching of a laser, a finesse parameter of the laser cavity is temporarily reduced by insertion of additional cavity loss, thereby allowing a population inversion in the laser's active medium to increase without an onset of lasing. When the loss element, typically an acousto-optic modulator (AOM), is switched off, an optical pulse quickly builds up within a few round trips of the cavity and a giant optical pulse is generated.

In conventional Q-switched lasers, round trip cavity loss of 5–10 dB is provided by an AOM positioned to deflect the laser mode into a first diffraction order and away from the cavity mirrors, while the optical output is provided by the zeroth diffraction order. Since this loss is typically higher than the cavity round trip optical gain, the AOM prevents lasing until it is switched off, at which point a giant optical pulse is generated within the cavity.

U.S. Pat. No. 5,193,096 to Amano discloses an acousto-optic Q-switched solid state laser having a Q-switching acousto-optic element intervening between the pair of laser resonance mirrors for controlling Q-switching oscillation by abruptly changing a loss of resonant laser light passing therethrough.

A similar approach to Q-switching was used in Q-switching of several prior-art fiber lasers. U.S. Pat. No. 4,955,025 to Mears et al discloses a diode-pumped fiber laser which can be Q-switched using an intra-cavity acousto-optic deflector in a transmission mode or a mechanical chopper, and having an output mirror partially transmissive at the lasing wavelength. U.S. Pat. No. 5,818,630 to Fermann et al. discloses a multi-mode fiber laser wherein an optical switch is employed for output coupling which also serves to modulate the loss (Q) of the cavity defined by two end mirrors. Alternatively, a pulsed output of this laser can be extracted by using a partially transmissive mirror.

However, in a fiber laser, especially a double-clad fiber laser, the length of the active medium is typically much longer than in a DPSS laser or other types of lasers, resulting in a round trip optical gain in excess of 10 dB for a cw fiber laser under typical pumping conditions, and a possibility of a much higher, up to 50 dB and more, round trip small signal gain for Q-switched lasers. In this case, maximum attainable loss from an AOM operating as an aforedescribed zero-order Q-switch can be insufficient to hold off the onset of lasing, and therefore this approach cannot always be used.

Instead, if an AOM is used as a Q-switch, the laser must be Q-switched in a first order operation wherein a laser cavity is formed when the AOM is switched on and the laser mode is deflected to the output cavity mirror in the first or higher diffraction order. The key advantage of the first order operation is that a contrast ratio of cavity loss in an "on" and "off" state in this instance can be more than 50 dB compared to less than 10 dB that can be typically achieved in the zero-order operation.

U.S. Pat. No. Re29,421 to Scott discloses first-order Q-switching with electronically selectable gain in a laser system comprising an acousto-optic deflector. A laser cavity includes a rod of lasing material between first and second reflecting means, said second reflecting means being positioned along a line that forms a preselected angle with the longitudinal axis of said laser rod; an acousto-optic beam deflector which deflects laser emission to said second reflecting means.

Other prior-art solutions for generating optical pulses in a fiber laser without an AOM have also been discussed. U.S. Pat. No. 6,510,167 to Jain et al. discloses a mode-locked fiber laser employing a fixed or tunable FBG at one end and an electro-optically tunable FBG at another end of an active fiber section, wherein the electro-optically tunable FBG is modulated to achieve active mode-locking. Relatively small modulation depth of the electro-optical tuning of the FBG described in U.S. Pat. No. 6,510,167 prevents however efficient Q-switching. U.S. Pat. No. 5,444,723 to Chandonnet et al discloses an optical switch in Q-switched fibre laser having length of exposed optical fibre mounted substantially parallel with movable index overlay perturbation pad whose refractive index is greater than optical fibre core for controlling amount of light escaping from core. Exposing a core of an optical fiber can however have negative effect on its long-term reliability and should generally be avoided.

The aforedesribed prior art Q-switching solutions, although answering their respective purposes, in addition to their aforementioned limitations have a common feature that negatively affects their output efficiency: the laser pulses are outputted when their respective Q-switches are turned on, and the laser is in a low-loss, high-Q state of the cavity. Therefore the pulses have to be output either through a partially transmitting mirror or through a beam-splitter, thereby reducing their output optical power. It will be therefore advantageous to have a laser apparatus for Q-switching having a partially reflecting output coupler that provides a high contrast ratio and reduces its reflectivity to output laser pulses.

It is an object of present invention to provide a pulsed fiber laser for efficient generation of high-power optical pulses and comprising a controllable reflecting/transmitting output coupler having a high contrast ratio and a switching time less than a pulse roundtrip in the laser cavity, and wherein the controllable reflecting/transmitting output coupler is switched to a transmitting state for outputting optical pulses.

It is another object of this invention to provide a method of Q-switching of a fiber laser enabling efficient generation and control of high-power optical pulses.

SUMMARY OF THE INVENTION

In accordance with a first aspect of the invention, a laser apparatus for generating optical pulses is provided, comprising a reflective gain element comprising first reflective means, an input/output port and a gain medium therebetween, and optical pump means for providing pump radiation into the gain medium for enabling optical gain for emitting optical radiation from the input/output port along a first optical path, and controllable reflecting/transmitting means disposed in the first optical path having a reflecting state for reflecting a controllable portion of the optical radiation back into the gain medium, and a transmitting state for transmitting the optical radiation along the first optical path to form an output optical radiation, wherein the controllable reflecting/transmitting means are operable to switch from the transmitting state to the reflecting state to form a temporal optical cavity between the first reflective means and the controllable reflective/transmitting means through the gain medium for a duration of time less than a roundtrip time of the controllable portion of the optical radiation in the temporal optical cavity.

In accordance with another aspect of the invention, a method of generating optical pulses by Q-switching is provided, comprising the steps of a) providing a reflective gain element comprising first reflective means, an input/output port and a gain medium therebetween, and optical pumping means for providing pump radiation into the gain medium for enabling optical gain, for emitting optical radiation from the input/output port along a first optical path, b) providing controllable reflecting/transmitting means disposed in the first optical path having a reflecting state for reflecting a controllable portion of the optical radiation back into the gain medium, a transmitting state for transmitting the optical radiation through the reflecting/transmitting means along the first optical path to form an output optical radiation, and operable to switch between said reflecting state and said transmitting state, c) switching the controllable reflecting/transmitting means from the transmitting state to the reflecting state to form a temporal optical cavity between the first reflective means and the controllable reflective/transmitting means through the gain medium for a duration of time less than a roundtrip time of the controllable portion of the optical radiation in the temporal optical cavity to initiate an optical pulse, d) switching the controllable reflecting/transmitting means from the reflecting state to the transmitting state for transmitting the optical pulse propagating from the gain element through the controllable reflecting/transmitting means along the first optical path.

In a preferred embodiment of the invention, the gain medium is a section of doped double-clad optical fiber having a single-mode core, and the controllable reflecting/transmitting means comprise path switching means for switching the controllable portion of the optical radiation along a second optical path, and second reflective means disposed in the second optical path for providing temporal optical feedback to the reflective gain element through the path switching means.

In one embodiment, the path switching means comprise a medium for inducing a temporal diffraction grating for switching the controllable portion of the optical radiation along the second optical path by means of diffraction, and wherein the second optical path is defined by a first or higher order diffraction of the optical radiation on the temporal diffraction grating. The path switching medium can be for example an acousto-optic switch.

In one embodiment of the second aspect of the invention, the step of switching the controllable reflecting/transmitting means from the transmitting state to the reflecting state further comprises a step of varying the fraction of optical radiation switched along the second optical path towards the second reflective means to shape the optical pulse.

BRIEF DESCRIPTION OF THE DRAWINGS

Exemplary embodiments of the invention will now be described in conjunction with the drawings in which.

DETAILED DESCRIPTION OF THE PREFERRED EMBODIMENT

Definitions

Before a substantive discussion of the preferred embodiment may begin, it is essential to define several key terms.

The term "frequency" and the term "wavelength" are used in this application interchangeably. Although, frequency equals speed divided by wavelength, in fiber applications, the speed of light in a fiber is constant. Therefore, for all intents and purposes, wavelength and frequency are used interchangeably.

The term "dopant" is used in the present invention to mean any extraneous element or combination thereof, which is added to a material to enhance or suppress a characteristic of that material. Examples of dopants include, but are not limited to: germanium (Ge), hydrogen (H), neodymium (Nd), ytterbium (Yb), zirconium (Zr), zinc (Zn), erbium (Er), praseodymium (Pr), thulium (Tm), and other atomic or ionic species. The particular characteristics of interest in the present invention are the ability to act as an active or light amplifying material.

The term "Bragg grating" is used in this application to mean a structure containing alternating periodic segments of varying periods of high and low refractive index material segments and/or appropriately embedded phase shift segments at well defined locations of the structure. A period is defined as one set of adjacent high and low refractive material segments. It is understood by this definition that the order of the high and low index materials is irrelevant, only that there is a change in refractive index between adjacent segments. While only uniform gratings are illustrated, non-uniform gratings are also contemplated within the scope of the invention.

The terms "fiber" or "fiber section" or "fiber optic waveguide" is used in this application to mean any waveguide utilized to guide light waves from one point to another. This definition specifically includes both single mode and multi-mode fibers as well as any waveguide having any cross-sectional shape or any single or multi-clad geometry, unless otherwise specified. In addition, this term also includes any waveguide whether doped or undoped, unless otherwise specified.

The term "gain medium" for the purpose of the present invention refers to a medium that provides gain to an optical signal. Examples of such mediums include, but are not limited to doped fiber optic waveguides or semiconductor optical amplifiers. There are a multitude of dopants that can be used to create a gain medium within a fiber segment (see the above definition of the term dopant).

The terms "acousto-optic modulator" (AOM) and "acousto-optic switch", or "AO switch", both mean in this application to comprise a medium wherein a diffraction grating can be controllably induced by means of an acousto-optic effect in response to an applied RF signal, and are used in this application interchangeably.

Figure 1:
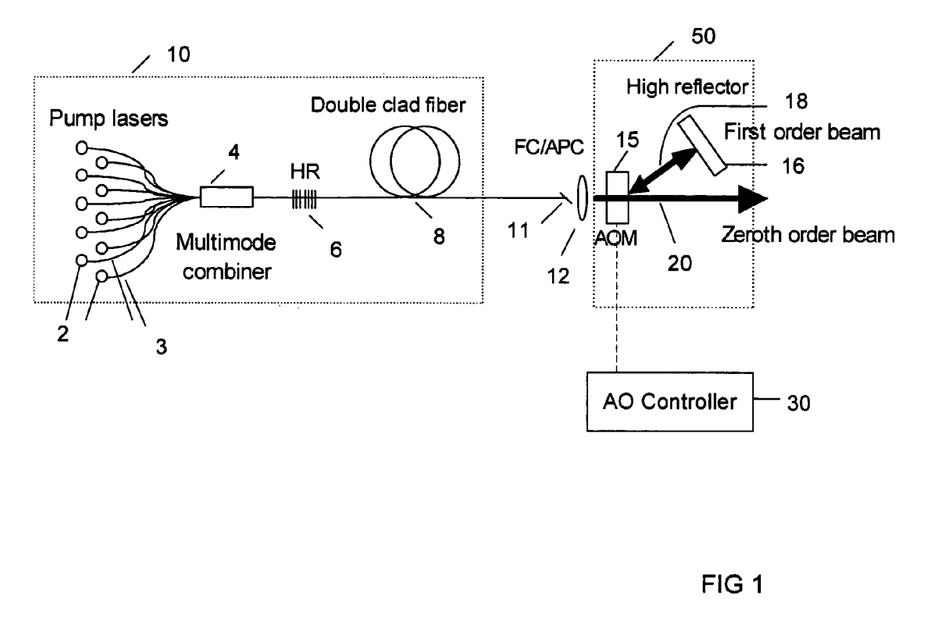
FIG. 1 is a diagram of the preferred embodiment of present invention.

A preferred embodiment of a laser apparatus for generating optical pulses is shown in FIG. 1 and is hereafter described.

A reflecting gain element 10 comprises a section of double-clad optical fiber 8, doped by one or several of rare-earth elements such as Yb or Er for enabling optical gain, a multi-mode pump combiner 4 attached and optically coupled to a proximal end of the double-clad fiber section 8, and first reflecting means 6. The multimode pump combiner 4 combines pump radiation from a plurality of pump sources 2, such as commercially available 980 nm diode lasers having fiber pigtails 3 coupled to an input port of the pump combiner 4, forms combined pump radiation and injects the combined pump radiation into the fiber section 8 through its proximal end. The first reflecting means 6 is a high-reflectivity frequency-selective reflector which is incorporated between the optical fiber section 8 in a vicinity of it proximal end, typically within 0.1–3 m from the pump combiner. Alternatively, the first reflecting means 6 can be incorporated within the pump combiner 4, or be attached to it optically connecting the pump combiner 4 and the doped fiber section 8. In a preferred embodiment, the high-reflectivity frequency-selective reflector 6 is a narrow-band fiber Bragg grating having maximum reflectivity exceeding 90% at a lasing frequency $f_{las}$ lying within a spectral range $\Delta f_g$ of a positive optical gain of the optically-pumped fiber segment 8, and is transmissive in a wavelength range of the pump radiation. For Ytterbium-doped fibers, this frequency range corresponds typically to a wavelength range between approximately 1060 nm and 1150 nm, which depends on pumping conditions, length of fiber section, existence of other doping species etc. A second end 11 of the doped fiber section 8 serves as an input/output port of the reflecting gain element 10 and is preferably polished at an angle to avoid back reflections into a guided fiber mode. For example, the fiber section can be terminated at the second end by a commercial optical connector of APC type. Total length of the doped fiber section 8 is typically from several meters to up to 100 meters or more. The doped fiber section 8, when pumped by sufficient pump radiation creating population inversion in the doped region of the fiber, is capable of emitting optical radiation from its second end by means of amplified spontaneous emission (ASE).

The input/output port 11 of the reflecting gain element 10 is optically coupled to an input port of a controllable reflecting/transmitting means 50 through a coupling lens 12 to receive the optical radiation from the fiber section 8, hereafter referred to as input radiation. The coupling lens 12 can be a set of coupling lenses or coupling and collimating lenses, as appropriate for efficient optical coupling of the fiber section 8 and the controllable reflecting/transmitting means 50. The controllable reflecting/transmitting means 50, hereafter also referred to as a switching module, has a reflecting state for reflecting back a portion of the input radiation having optical frequency substantially equal to $f_{las}$, and a transmitting state for transmitting the input radiation though an output optical port of the switching module, with substantially zero reflection, to form an output radiation 20. The switching module 50 can be switched from the transmitting state to the reflecting state over a characteristic turn-on time $\tau_{ON}$ in response to a control signal, and switched back from the reflecting state to the transmitting state over a turn-off time $\tau_{OFF}$. The turn-on and turn-off times determine a characteristic switching time $\tau$ of the switching module 50, which can be defined for example as a sum of the turn-on and turn-off times.

In some embodiments, a fraction of input radiation reflected back by the switching module in the reflecting state can be varied by varying the control signal.

When the switching module 50 is turned on, i.e. is in the reflecting state, the first reflective grating 6 and the switching module 50 form a temporal optical cavity wherein the gain medium 8 is confined. This optical cavity has an optical length L defined primarily by an optical length of the fiber section 8 between the first reflective means 6 and the fiber input/output coupler 11. Other contributors to the optical length of the cavity are an optical path between the input/output fiber coupler 11 and the input port of the switching module, and an internal optical path within the switching module 50. The optical length of the cavity defines a photon round-trip time within the cavity $\tau_{cav}=2L/c$, where c is the speed of light.

In the preferred embodiment, the controllable reflecting/transmitting means 50 comprise an acousto-optic (AO) switch 15, hereafter also referred to as an acousto-optic modulator (AOM), an AO controller 30 and second reflecting means 16. The AO switch 15 is electrically connected to the AO controller 30 which is capable of providing an RF signal to the AO switch for inducing a temporal diffraction grating in the AO medium. The temporal diffraction grating is capable of deflecting a portion of the input optical radiation having optical frequency $f_{las}$, in a diffraction direction 18 towards the second reflecting means 16. The second reflecting means 16 can be for example a dielectric mirror or any other reflector reflective at the optical frequency $f_{las}$ and will be hereafter referred to as a second reflector 16. The diffraction direction 18 can be a first or higher order diffraction direction for the input optical radiation with frequency $f_{las}$. When the RF signal is applied to the AO switch, a temporal optical cavity between the first reflector 6 and the second reflector 16 comprising the fiber section 8 is formed over the turn-on time $\tau_{ON}$. When the RF signal is turned off, after a time delay $\tau_{OFF}$ the temporal diffraction grating ceases to exist and the input radiation is passed towards the output port of the AO switch without being deflected to form the output radiation $P_{out}$ propagating in zeroth diffraction order direction 20.

Further important features of the invention will become clear from considering operation of the laser apparatus for generating optical pulses in accordance with the preferred embodiment of the invention. This operation will now be described with reference to FIG. 2A and FIG. 2B.

We will assume for clarity that the laser operation starts with the AO switch 15 turned off, and the reflecting/transmitting means 50 in the transmitting state. In this state, no RF signal is supplied from the OA controller to the AO switch, no temporal diffraction grating is therefore induced, allowing the optical radiation coupled into the input port of the AO switch 15 from the doped fiber section 8 to pass through the AO switch to the output port of the reflecting/transmitting means 50 without diffraction. Although some of the input radiation can be lost due to attenuation within the AO switch, any back reflections in this state are negligible, which is ensured by an appropriate design of the AO switch known to those skilled in the art. In this state, absorption of pump radiation by the rare-earth doped fiber section 8 leads to energy accumulation in the fiber by means of increased population inversion, which is balanced only by the spontaneous emission of optical radiation from within the doped region of the fiber. Part of the spontaneous emission confined within a guided mode of the fiber core propagates along the fiber with amplification. As a result, the input optical radiation received by the switching module 50 from the fiber section 8 in this state is the amplified spontaneous radiation PASE shown in FIG. 2A by a line 200. Most of the pump power in this state is accumulated by the doped fiber section in a form of population inversion.

Figure 2A:
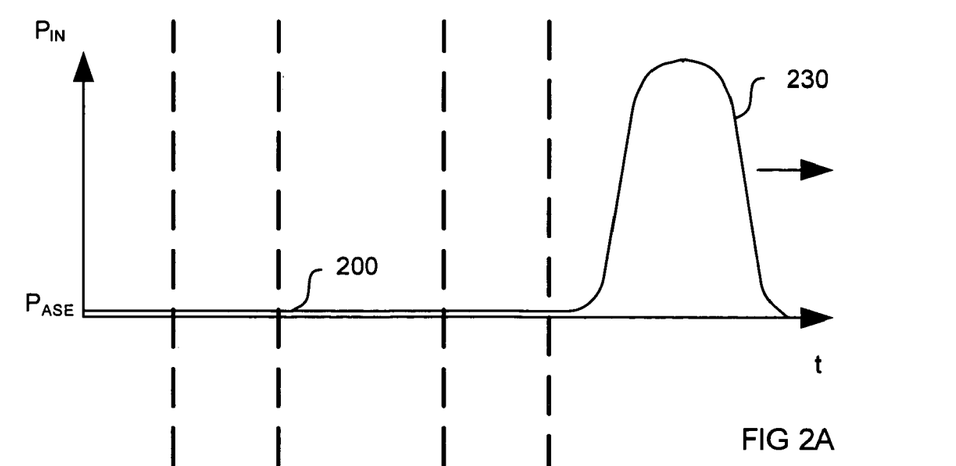
FIG. 2A is a time diagram of an output pulse entering the AO switch.
Figure 2B:
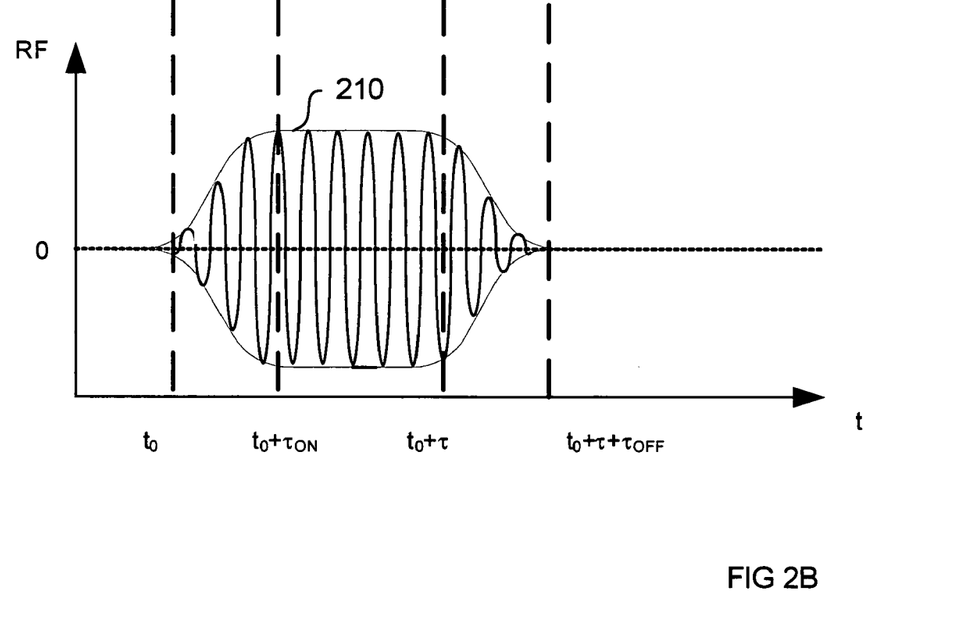
FIG. 2B is a time diagram of an RF pulse applied to the AO switch.

With reference to FIG. 2B, at a time instant $t_0$ the AO controller turns the AO switch 15 first on and then, in a time interval τ, off, thereby forming an RF pulse 210 of a pre-determined amplitude and frequency. The RF pulse is applied to the AO medium inducing a temporal diffraction grating therein, having an instantaneous diffraction efficiency that varies according to the applied RF signal. A substantial portion of the input radiation is deflected by the temporal diffraction grating in the diffraction direction 18, thereby forming a seed optical pulse. The seed optical pulse is reflected towards the AO switch by the reflector 16, and is then coupled back into the doped fiber section 8 by the temporal diffraction grating induced in the AO switch by the RF pulse 210. After a round-trip in the fiber section 8 from the input/output coupler 11 to the high-reflectivity reflector 6 and back, the seed optical pulse is greatly amplified and shaped by the gain medium by absorbing the accumulated pump energy. An amplified optical pulse 230 thereby formed is coupled into the input port of the AO switch 15.

In a typical prior-art Q-switched laser arrangement, an optical pulse is outputted while a laser cavity remains in a high-Q state, either through an output mirror or an intra-cavity beam splitter. This standard arrangement may be advantageous for short cavities having relatively low round-trip optical gain, defined as an optical gain that a laser pulse experiences after a round-trip in the laser cavity, since multiple pulse round-trips are needed then to obtain sufficient pulse amplification. However, this prior-art arrangement reduces output-efficiency of the laser, since part of a pulse energy is either lost or returned back into the laser cavity.

In the present invention, however, the controllable reflecting/transmitting means 50 are switched to the transmitting state before the amplified optical pulse reaches said reflecting/transmitting means 50 as it is shown in FIGS. 2A and 2B, allowing said pulse to propagate through it to the output port. To enable this switching, the controllable reflecting/transmitting means 50 are provided having the characteristic switching time $\tau_{switch}$ which is less than the cavity round-trip time $\tau_{cav}$:

$$\tau_{switch} < \tau_{cav}, \quad (1)$$

In the preferred embodiment shown in FIG. 1, the AO switch is turned off before the amplified pulse reaches the AO switch, allowing said pulse 230 to prorogate through the switch without being deflected. This novel approach to Q-switching of the instant invention improves the output efficiency of the Q-switched fiber laser and includes additional advantages.

For fiber lasers, this approach is supported by a key difference between a conventional solid-state laser and a fiber laser, namely their cavity length differs by approximately two orders of magnitude. For a typical fiber laser cavity of 30 m, the optical round trip time is 300 nsec. This round trip time is of the same order of magnitude as the switching time τ of an AOM, which is ~100 nsec for a typical 80 μm beam diameter. Since condition (1) holds in this case, it is possible to switch on the AOM to initiate the build up of an optical pulse, and switch off the AOM before the pulse travels through the cavity and returns to the AOM.

In this case, the output pulse is transmitted through the AOM and is not affected by the AOM diffraction efficiency or by transmission losses through an output mirror. Multiple round-trips of a pulse in the fiber cavity are unnecessary and may be even undesirable because of a very large round-trip gain in a long section of doped fiber, and because of saturation of the pulse power which may occur during already the first round-trip of the pulse in the fiber cavity.

In some embodiments, however, the optical pulse 230 may not acquire enough energy after a single round-trip through the gain medium to cause gain saturation. In these embodiments, the switching module 50 can be kept in the reflecting state for a duration of time allowing the pulse to make a pre-determined number N of roundtrips in the cavity, and then switching it to the transmitting state before the pulse reaches the input port of the switching module. The pulse duration is smaller than the cavity roundtrip and the switching time, and therefore the pulse can be extracted out of the cavity substantially without loss.

Key advantages of the aforedescribed approach of the present invention to Q-switching are:

1) Since the output pulse does not experience transmission losses at the output, the laser efficiency is ~20% higher than in a conventional architecture.

2) The output laser efficiency is independent on the AOM diffraction efficiency, therefore a robust, inexpensive material such as fused silica can be used instead of more exotic high-AO coefficient materials, such as $TeO_2$, which are used in high-efficiency AOM. This greatly reduces a potential for optical damage in the AOM from high-power optical pulses.

3) The pulses exit the AOM along the center of the optical axis, greatly simplifying design of optical lenses following the laser.

In another embodiment, the AOM can be kept on during the output of the optical pulse, deflecting a major portion of the pulse into the first order direction 18 away from the output port of the laser. This approach can be used to integrate a 'pulse picking' capability into the laser where individual pulses can be selected from the laser output.

In yet another embodiment, reflectivity of the second reflector 16 can be adjusted over a wide range to optimize the pulse shape and duration. Alternatively, the AOM diffraction efficiency can be actively adjusted by varying amplitude of the RF signal to control the pulse build up time and resulting pulse shape. This may be particularly important for tailoring the pulse shape to minimize optical non-linearities in the fibers.

The aforedescribed Q-switching architecture has also advantages compared to more traditional prior art architecture wherein a Q-switch such as AOM is disposed at a high-reflectivity (HR) end of the cavity between a high-reflectivity reflector and a gain medium, rather than at an output end between the gain medium and an output coupler. These advantages include:

1) Elimination of a need for a pump/signal multiplexer, thereby allowing a simpler end pumped laser architecture;

2) Reduction of an amount of power that has to be free space coupled into a single mode fiber. If the AOM is located at the HR end of the cavity, essentially all the optical power must be re-coupled into the single mode fiber after reflection from the HR reflector. In the output AOM configuration of present invention, only 4% or less of the output power is coupled back into the single mode fiber. This is especially important at high average power operation to reduce optical damage;

3) Reduced fiber coupling losses and AOM losses, since the output pulse passe through the AOM only once; note that due to the aforementioned saturation of the pulse power in the pumped fiber section, initial power of the seed pulse, and therefore AOM-fiber coupling loss of the seed pulse is of lesser importance;

The aforedescribed preferred embodiment of the first aspect of present invention wherein a laser apparatus for generating optical pulses is provided, comprises a doped optical fiber as a gain medium, and an AOM—based reflecting/transmitting means for Q-switching. However, other embodiments of the invention are possible comprising other types of reflecting gain elements and/or other types of reflecting/transmitting means, wherein the reflecting/transmitting means have a reflecting state and a transmitting state, and are operable to switch from the transmitting state to the reflecting state to form a temporal optical cavity for a duration of time less than a roundtrip time of the controllable portion of the optical radiation in the temporal optical cavity.

In one alternative embodiment, a fast mechanical switch, for example a MEMS-based switch, can be used instead of the AO switch of the preferred embodiment, without any changes to the laser architecture shown in FIG. 1 or to the aforedescribed method of it operation which would be significant in the context of this invention.

Figure 3A:
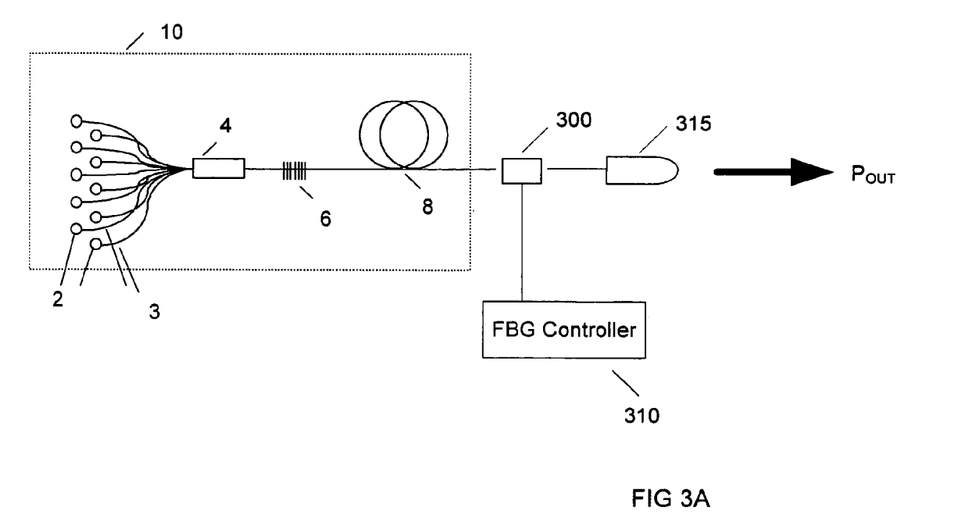
FIG. 3A is a diagram of a fiber apparatus for generating optical pulses comprising a tunable fiber Bragg grating in accordance with present invention.

With reference to FIG. 3A, in another embodiment a narrow-band tunable fiber Bragg grating (FBG) module 300 is used as the reflecting/transmitting element, an FBG controller 310 is electrically connected to the FBG module 300 for tuning a wavelength of the DFB reflection, and an output coupler 315 is disposed at the output end of the tunable FBG module 300. Similar to the preferred embodiment shown in FIG. 1, the reflecting gain element comprises an optically-pumped section of doped fiber and the first high-reflectivity reflector 6, for example a first FBG, coupled to the fiber section 8 close to the proximal end of said fiber section.

Figure 3B:
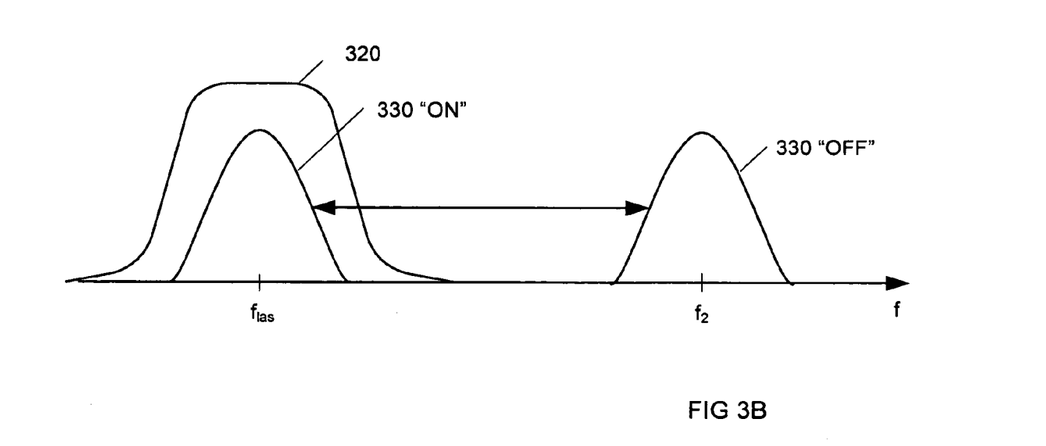
FIG. 3B is a diagram illustrating operation of the fiber apparatus for generating optical pulses comprising a tunable fiber Bragg grating in accordance with present invention.

Operation of this embodiment of the laser apparatus for generating optical pulses in accordance with current invention will be now briefly described with reference to FIG. 3B. Reflection band 330 of the tunable FBG module can be either aligned in a frequency domain with a reflection band 320 of the first high-reflectivity FBG centered at the optical frequency $f_{las}$, or be shifted away from the reflection band of the first FBG so to reduce their overlap to a negligible level, preferably by at least 10 dB. A state wherein the reflection band of the tunable FBG is shifted away from the reflection band 320 of the first FBG corresponds to an "OFF" state of the laser wherein the pump energy is being accumulated by the gain medium. A build-up of an optical pulse having optical frequency $f_{las}$ is initiated by aligning of the respective reflection bands at the laser frequency $f_{las}$, which corresponds to turning on a temporal laser cavity between the first FBG 6 and the tunable FBG 300. In a time interval less than the cavity round trip time $\tau_{cav}$ after said aligning of the reflection bands, the reflection band 330 is tuned away from the reflection band 320 of the first FBG, for example by stretching the FBG using a fast piezo-electric effect, and the optical pulse is transmitted through the tunable FBG to the output coupler 315 and forms an output laser pulse. Although all the aforedescribed embodiments of the present invention comprise a section of doped optical fiber as a gain element, those skilled in the art will understand that the present invention is not limited to fiber lasers, but may use other types of gain elements as long as the laser cavity round-trip time and the characteristic switching time of the constituent transmitting/coupling means are related according to equation (1).

Figure 4:
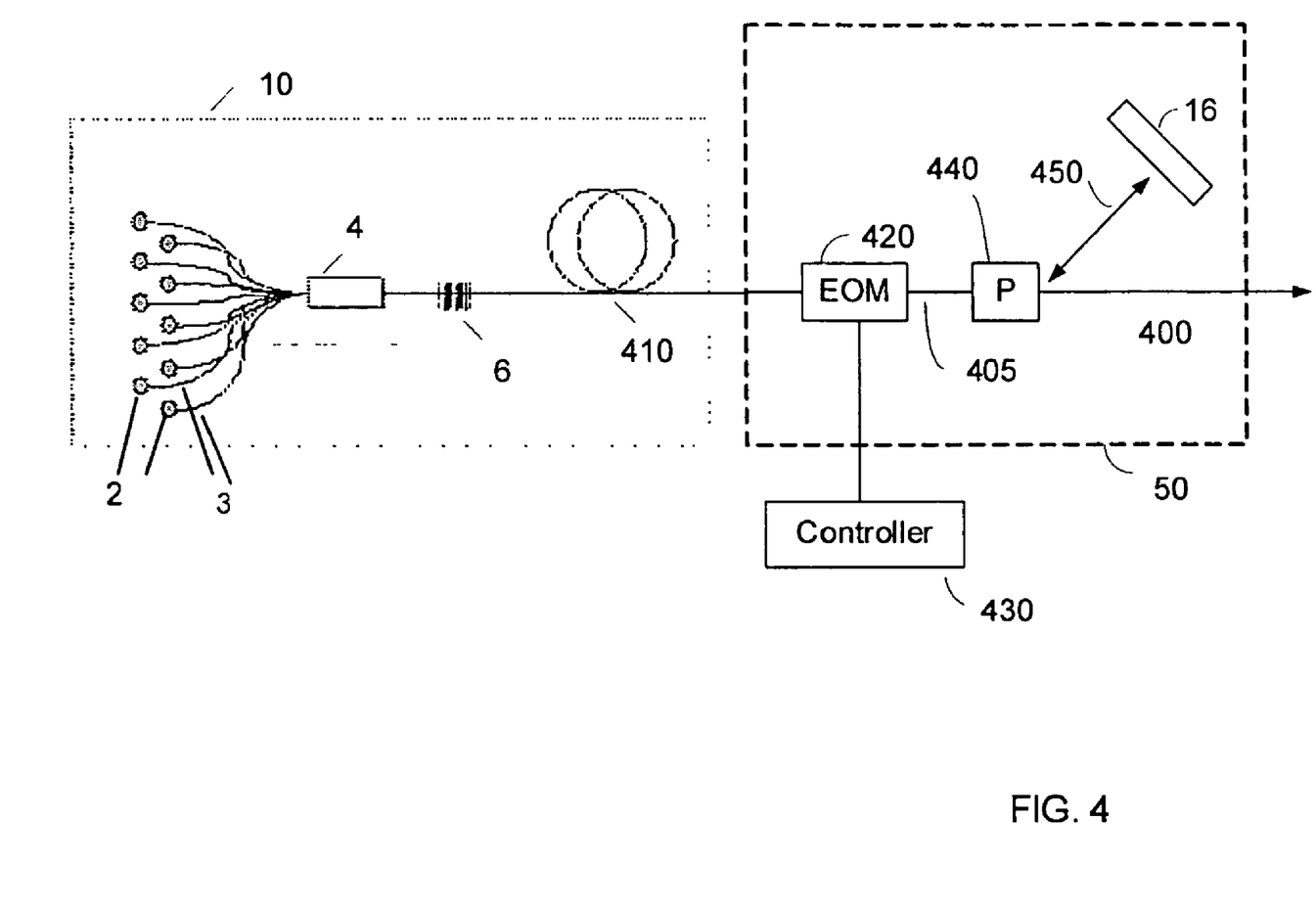
FIG. 4 is a diagram of a fiber apparatus for generating optical pulses comprising an electro-optic switch.

With reference to FIG. 4, another alternative embodiments will now be described wherein the reflecting/transmitting element is based on an electro-optical (EO) switch 420 operable to switch polarization of optical radiation passing therethrough between two orthogonal polarization states. EO switches capable of this functionality are commercially available and are typically made of an electrooptic material having electrically controllable birefringence such as $LiNbO_3$.

A doped section of a double-clad polarization maintaining fiber 410 having a pumped combiner 4 and a high-reflectivity reflector 6 at one end thereof is optically coupled through its other end to an input optical port of the EO switch 420. An output optical port of the EO switch is coupled to an input port of a polarization beam splitter 440. The doped section of a double-clad polarization maintaining fiber 410 supports preferential propagation of light in a substantially single polarization state, and has a high optical loss for light in an orthogonal polarization state. When optically pumped through the pump combiner 4, said fiber section 410 provides optical gain and emits at least partially polarized ASE radiation which is coupled into the EO switch 420. The EO switch 420 has a preferred polarization state of input radiation and is oriented relatively to the output end of the fiber section 410 for aligning its preferred polarization state with a dominant polarization state of the at least partially polarized ASE radiation.

The EO switch 40 is operable to switch polarization of optical radiation passing therethrough between two orthogonal output polarization states, which are hereafter referred to as a polarization sate A and a polarization state B. An output port of the EO switch 405 is optically coupled to a polarization beam splitter 440. The polarization beam splitter 440 is oriented to pass radiation having one of the output polarization states of the EO switch, for example the polarization state A therethrough, and to deflect the orthogonally polarized radiation having the polarization state B towards a high-reflectivity mirror 16. An EO controller 430 is provided having an output electrical port electrically connected to an input electrical port of the EO switch 420 for controllably switching output polarization of the EO switch between the states A and B.

The EO switch 420, the polarization beam splitter 440 and the high reflectivity mirror 16 form therefore a controllable reflecting/transmitting means 50 operable to switch between a transmitting state wherein optical radiation coupled into the input optical port of the EO switch is transmitted therethrough to form output laser radiation 400, and a reflecting state wherein a temporal optical cavity between the reflector 6 and the mirror 16 is formed and wherein a buildup of optical pulse is initiated as described with reference to FIG. 2. Compared to the aforedescribed first embodiment of the invention employing an AO switch, instant embodiment employs an EO switch which can be switched much faster than an AO switch, and can therefore be used when the doped fiber section is relatively short, for example as one meter or less. Double clad fiber lasers as short as several cm have been demonstrated.

Of course other embodiments may be envisioned without departing from the spirit and scope of the invention.

What is claimed is:

1. A laser apparatus for generating optical pulses, comprising:
    a reflective gain element having first reflective means, an input/output port, a gain medium therebetween and optical pumping means for providing pump radiation into the gain medium for enabling optical gain, for emitting optical radiation from the input/output port along a first optical path;

controllable reflecting/transmitting means disposed in the first optical path having a reflecting state for reflecting a controllable portion of the optical radiation back into the gain medium, and a transmitting state for transmitting the optical radiation along the first optical path to form output optical radiation;

wherein the controllable reflecting/transmitting means are operable to switch from the transmitting state to the reflecting state to form a temporal optical cavity between the first reflective means and the controllable reflective/transmitting means through the gain medium for a duration of time less than a roundtrip time of the controllable portion of the optical radiation in the temporal optical cavity.

2. The laser apparatus as defined in claim 1, wherein the gain medium is a solid-state gain medium.

3. The laser apparatus as defined in claim 2, wherein the solid-state gain medium has waveguiding properties.

4. The laser apparatus as defined in claim 3, wherein the solid-state gain medium is a section of optical fiber having a first end and a second end, and wherein the second end is the input/output port of the gain element.

5. The laser apparatus as defined in claim 4, wherein the optical fiber is a double-clad optical fiber.

6. The laser apparatus as defined in claim 5, wherein the optical pumping means comprise one or more pump sources for generating pump radiation and a pump combiner coupled to the optical fiber for combining the optical pump radiation from the one or more pump sources into a combined pump radiation and for coupling the combined pump radiation into the optical fiber.

7. The laser apparatus as defined in claim 6, wherein the pump combiner is coupled to the optical fiber through the first fiber end.

8. The laser apparatus as defined in claim 5, wherein the first reflective means is a fiber Bragg grating incorporated into the optical fiber.

9. The laser apparatus as defined in claim 8, wherein the controllable reflecting-transmitting means comprise a tunable Bragg grating.

10. The laser apparatus as defined in claim 4, wherein at least a portion of the optical fiber is doped with a rare-earth element.

11. The laser apparatus as defined in claim 4, wherein at least a portion of the optical fiber is doped with at least one of the following elements: Nd, Yb, Er, Er:Yb, Tm.

12. The laser apparatus as defined in claim 3, wherein the solid-state gain medium has a single-mode core for supporting a single spatial mode of the optical radiation.

13. The laser apparatus as defined in claim 1, wherein the output optical radiation comprises a single spatial mode.

14. The laser apparatus as defined in claim 1, wherein the controllable reflecting/transmitting means comprise a mechanical switch.

15. The laser apparatus as defined in claim 1, wherein the controllable reflecting/transmitting means comprise an electro-optic switch.

16. The laser apparatus as defined in claim 1, wherein the controllable reflecting/transmitting means comprise an acousto-optic switch.

17. The laser apparatus as defined in claim 1, wherein the controllable reflecting/transmitting means comprise:
  path switching means for switching the controllable portion of the optical radiation along a second optical path; and,
  second reflective means disposed in the second optical path for providing temporal optical feedback to the reflective gain element through the path switching means.

18. The laser apparatus as defined in claim 17, wherein the path switching means comprise a medium for inducing a temporal diffraction grating for switching the controllable portion of the optical radiation along the second optical path by means of diffraction, and wherein the second optical path is defined by a first or higher order diffraction of the optical radiation on the temporal diffraction grating.

19. The laser apparatus as defined in claim 17, wherein the switching means are controllable to vary a fraction of optical radiation switched towards the second reflective means along the second optical path.

20. The laser apparatus as defined in claim 17, wherein the switching means have a characteristic switching time, and wherein the characteristic switching time is less than a roundtrip time of the portion of optical radiation between the second reflective means and the first reflective means.

21. A method of generating optical pulses by Q-switching, comprising the steps of:
  providing a reflective gain element comprising first reflective means, an input/output port, a gain medium therebetween and optical pumping means for providing pump radiation into the gain medium for enabling optical gain, for emitting optical radiation from the input/output port along a first optical path;
  providing controllable reflecting/transmitting means disposed in the first optical path having a reflecting state for reflecting a controllable portion of the optical radiation back into the gain medium, a transmitting state for transmitting the optical radiation through the reflecting/transmitting means along the first optical path to form an output optical radiation, and operable to switch between said reflecting state and said transmitting state;
  switching the controllable reflecting/transmitting means from the transmitting state to the reflecting state to form a temporal optical cavity between the first reflective means and the controllable reflective/transmitting means through the gain medium for a duration of time less than a roundtrip time of the controllable portion of the optical radiation in the temporal optical cavity to initiate an optical pulse; and,
  switching the controllable reflecting/transmitting means from the reflecting state to the transmitting state for transmitting the optical pulse propagating from the gain element through the controllable reflecting/transmitting means along the first optical path.

22. A method of generating optical pulses as defined in claim 21, wherein the controllable reflecting/transmitting means comprises:
  path switching means for switching the controllable portion of the optical radiation along a second optical path; and,
  second reflective means disposed in the second optical path for providing temporal optical feedback to the reflective gain element through the path switching means;
and wherein the step of switching the controllable reflecting/transmitting means from the transmitting state to the reflecting state further comprises a step of varying the fraction of optical radiation switched along the second optical path towards the second reflective means to shape the optical pulse.

23. A method of generating optical pulses as defined in claim 22, wherein the reflective gain element comprises a section of double-clad doped optical fiber as the gain medium having a first end for optical pumping and a second end as the input/output port, optical pumping means for pumping the section of the double-clad optical fiber through the first end, said optical pumping means comprising a plurality of pump sources optically coupled to a pump combiner coupled to the first end, and wherein the controllable reflecting/transmitting means can comprise one of: a mechanical switch, an electro-optic switch, an acousto-optic switch, a tuneable Bragg grating.

24. A method of generating optical pulses by Q-switching, comprising the steps of:
- providing a reflective gain element comprising first reflective means, an input/output port and a gain medium therebetween, for emitting optical radiation from the input/output port along a first optical path;
- providing optical pumping means for providing pump radiation into the gain medium for enabling optical gain;
- providing controllable reflecting/transmitting means disposed in the first optical path having a reflecting state for reflecting a controllable portion of the optical radiation back into the gain medium, a transmitting state for transmitting the optical radiation through the reflecting/transmitting means along the first optical path to form an output optical radiation, and operable to switch between said reflecting state and said transmitting state;
- switching the controllable reflecting/transmitting means from the transmitting state to the reflecting state to form a temporal optical cavity between the first reflective means and the controllable reflective/transmitting means through the gain medium; and,
- switching the controllable reflecting/transmitting means from the reflecting state to the transmitting state for transmitting the optical pulse propagating from the gain element through the controllable reflecting/transmitting means along the first optical path after the optical pulse makes a pre-determined number of round trips in the temporal optical cavity.

* * * * *